Aug. 22, 1961     M. S. ÖZKÖK     2,997,012
VEHICLE POWER AND STEERING SYSTEM FOR BOATS
Filed Aug. 6, 1959     2 Sheets-Sheet 1
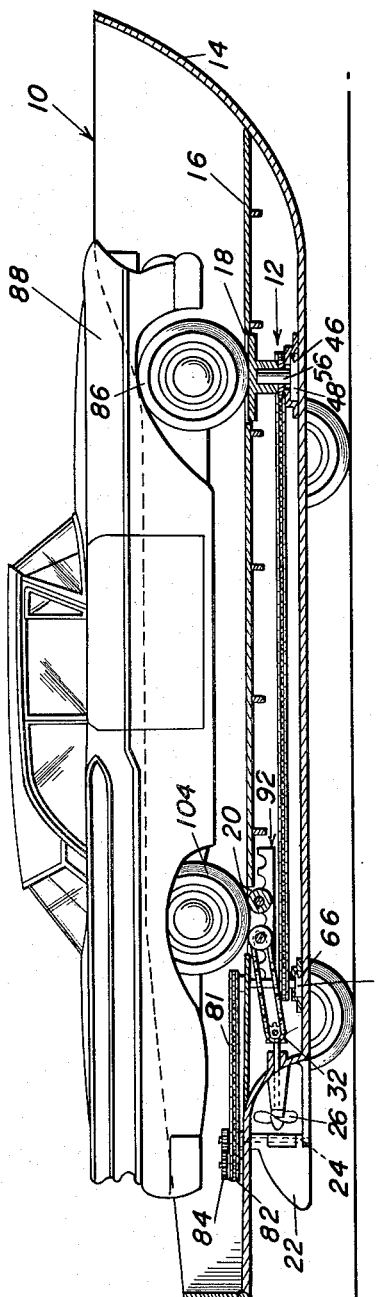
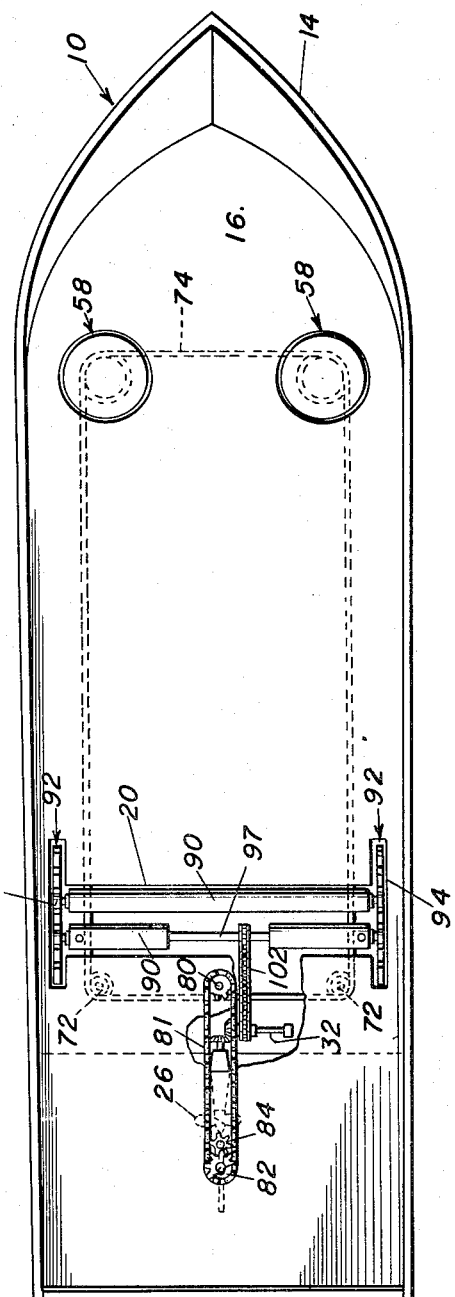
Mehmet S. Özkök
INVENTOR.

Aug. 22, 1961  M. S. ÖZKÖK  2,997,012
VEHICLE POWER AND STEERING SYSTEM FOR BOATS
Filed Aug. 6, 1959  2 Sheets-Sheet 2

Mehmet S. Özkök
INVENTOR.
BY Clarence A. O'Brien
and Harvey B. Jacobson
Attorneys

United States Patent Office 2,997,012
Patented Aug. 22, 1961

2,997,012
VEHICLE POWER AND STEERING SYSTEM FOR BOATS
Mehmet S. Özkök, Durham, N.C.
(Beyazit Bahar, Apt. No. 17, Istanbul, Turkey)
Filed Aug. 6, 1959, Ser. No. 832,032
4 Claims. (Cl. 115—.5)

This invention relates to a novel and useful vehicle power and steering system for boats, and more particularly relates to a device which is to be secured in a boat and operatively connected to the propeller and rudder of a boat, the device including turntables and rollers and being adapted to support a conventional form of a motor vehicle with the rear wheels thereof engaged with driving rollers and the front turning wheels thereof engaged with turntables for the purpose of steering the boat.

The main object of this invention is to provide a power and steering system for boats which will enable a conventional form of motor vehicle to be positioned in the boat for the purpose of supplying driving power to the propeller of the boat and control over the rudder thereof so as to provide a means for steering the boat.

A further object, in accordance with the preceding object, is to provide a means whereby adjustment for vehicles of varying wheel bases may be readily made.

Still another object, in accordance with the preceding object, is to provide a means whereby the system may be adjusted for vehicles having their front wheels varying distances apart.

Yet another object of this invention is to provide a means whereby the propeller of the boat may be rotated in an opposite direction to reverse the boat by placing the vehicle in reverse gear.

Still another object of this invention is to enable the driver of a vehicle to navigate the boat from the driver's seat of the vehicle in the normal manner in which the driver would normally drive the vehicle.

Another object of this invention, in accordance with the preceding objects, is to provide a vehicle power and steering system which is adapted to support a vehicle in such a manner whereby the vehicle will be maintained against accidental movement relative to the boat should a rough sea be encountered.

A final object to be specifically enumerated herein is to provide a vehicle power and steering system for boats which will conform to conventional forms of manufacture, be of sturdy construction, and simple to operate so as to provide a device that will be economically feasible, long lasting, and operable by any person capable of driving a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal vertical sectional view of a boat with the power and steering system incorporated therein taken substantially upon a plane passing through the center of the boat, a conventional form of passenger vehicle being shown in position engaging the steering and driving assemblies of the invention;

FIGURE 2 is a top plan view of the boat as shown in FIGURE 1 with the motor vehicle being removed.

Figure 3:
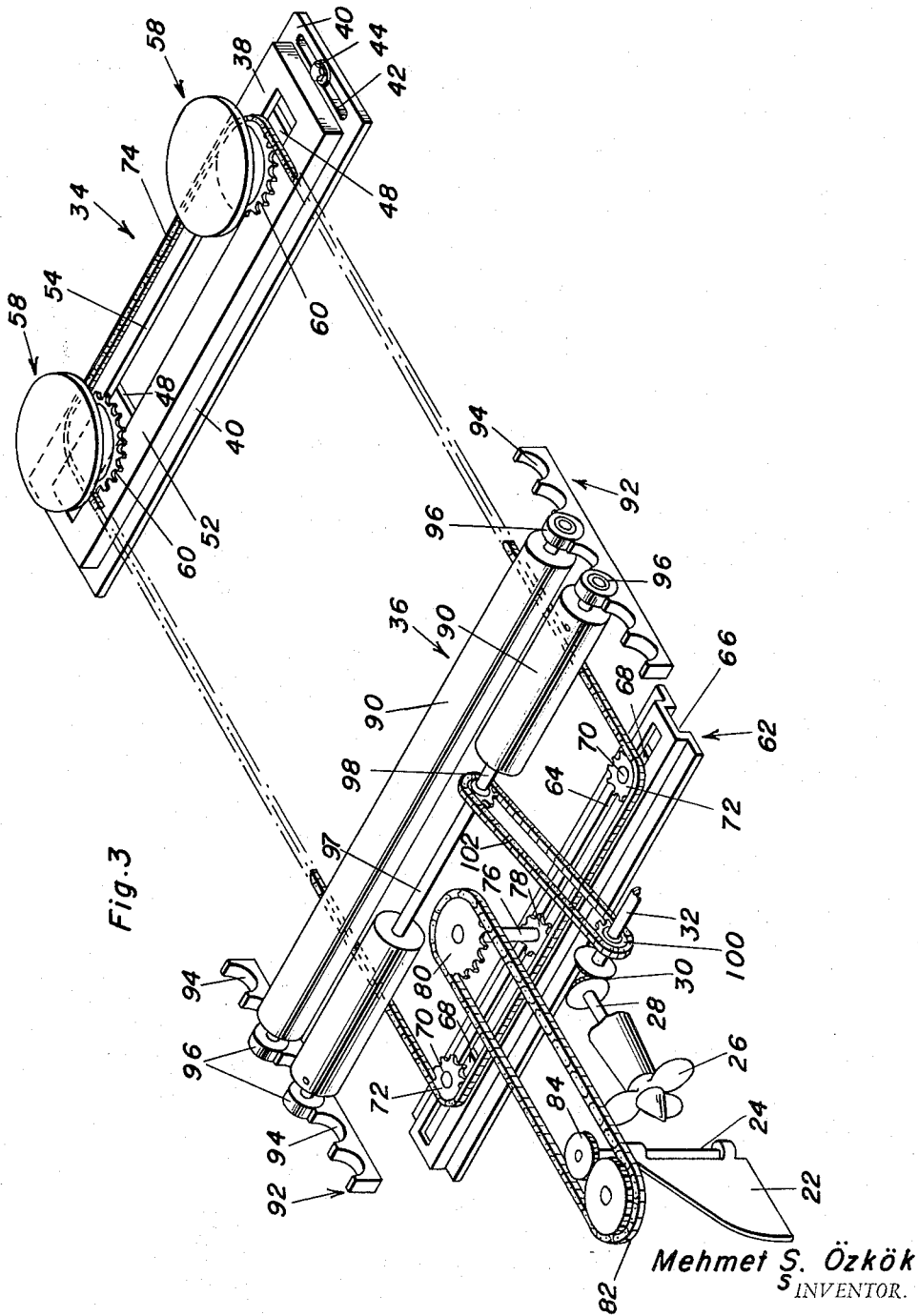
FIGURE 3 is an enlarged perspective view of the invention shown with the component parts thereof in their normal positions relative to each other with the boat being removed.

Referring now more specifically to the drawings, the numeral 10 generally designates the boat in which is mounted the power and steering system of this invention and which is generally referred to by the reference numeral 12. The boat 10 includes a hull 14 of conventional design having a flooring 16 therein with two longitudinally spaced transversely extending slots 18 and 20 formed therein for a purpose to hereinafter be set forth. The boat hull 14 also includes a steering mechanism including a rudder 22 which is mounted upon a rudder shaft 24 and a propeller 26 for propelling the boat 10 which is secured to a propeller shaft 28 being driven through a gearing connection 30 from a drive shaft 32.

The power and steering system 12 includes a steering assembly generally referred to by the reference numeral 34 and a driving assembly generally referred to by the reference numeral 36.

The steering assembly 34 comprises a first mounting beam 38 which is generally inverted U-shaped in configuration and provided with suitable peripheral horizontal lower flanges 40 which may be utilized to secure a first mounting beam 38 to the bottom of the boat hull 14. Preferably, the flanges 40 on each end of the first mounting beam 38 are provided with transversely extending slots 42 through which any suitable fasteners 44 may be inserted and secured to the bottom of the boat hull 14 in any convenient manner with the mounting beam 38 extending transversely of the boat hull 14 so as to enable the mounting beam 38 to be adjustably positioned longitudinally of the hull 14.

The inverted U-shaped configuration of the mounting beam 38 provides a transversely extending channel 46, see FIGURE 1, in which a pair of retaining plates 48 are slidably mounted for movement longitudinally of the mounting beam 38 or transversely of the boat. Formed in the bight portion 52 of the mounting beam 38 is a longitudinally extending slot 54. Each of the retaining plates 48 has one end of a stub axle 56 secured thereto which extends upwardly through the slot 54.

A turntable generally referred to by the reference numeral 58 is rotatably journaled on the upper ends of each of the stub axles 56 and is provided with a sprocket gear 60.

From the foregoing it is to be noted that the mounting beam 38 may be adjustably positioned longitudinally of the hull 14 and that the turntables 58 may each be adjustably positioned transversely of the beam 38 and also in adjusted spaced relation to each other.

It is to be understood that the first mounting beam 38 is secured to the forward portion of the boat hull 14 and with attention now directed more particularly to FIGURES 1 and 3 it will be seen that there is provided a second transversely extending mounting beam generally referred to by the reference numeral 62 which is also inverted U-shaped in configuration and may be fixedly secured to the rear portion of the hull 14 of the boat 10 in any convenient manner. The second mounting means 16 is also provided with a longitudinally extending slot which is designated by the reference numeral 64 and it will be noted that the pocket 66 formed between the mounting beam 62 and the hull 14 has a pair of retaining plates 68 slidably disposed therein with each having one end of a vertically disposed idler shaft secured thereto. Journaled for rotation about the upper end of each of the idler shafts 70 is an idler sprocket 72 and with attention directed now more particularly to FIGURE 3 of the drawings, it will be seen that there is provided an endless chain 74 which is entrained about sprockets 60 and 72.

Secured to and rotatably journaled in the midportion of the mounting beam 62 in any convenient manner, not shown, is an upstanding intermediate shaft 76 which has fixedly secured thereto in alignment with and in engagement with chain 74 an intermediate sprocket 78. The intermediate shaft 76 projects above the intermediate sprocket 78 and there is fixedly secured on the uppermost portion thereof a driving sprocket 80 which is in alignment with a driven sprocket 82 that is drivingly connected to the rudder shaft 24 by means of a gearing assembly 84.

It may now be seen, with attention directed more particularly to FIGURES 1 and 3 of the drawings, that the steering wheels 86 of the vehicle 88 are positioned on substantially the center of each of the turntables 58 and that the movement of the wheels 86 in a manner that would normally steer the vehicles while moving along the road will cause the rotation of the turntables 58 which rotation will effect movement of the rudder in the opposite direction thereby turning the boat 10 in the direction in which the wheels 86 of the vehicle 88 are turned.

The driving assembly 36 includes a pair of horizontally disposed spaced rollers 90 which are journaled for rotation about axes extending transversely of the boat 10 by means of a pair of journal blocks generally referred to by the reference numeral 92 which are fixedly secured to the boat 10 in any convenient manner extending longitudinally of the hull 14. Each of the journal blocks 92 includes a rectangular block having a plurality of upwardly opening semi-circular notches 94 formed in the upper surface or side edges thereof. Each of the rollers 90 has a bearing member 96 secured to the opposite ends thereof, the bearings 96 being receivable in any one of the notches 94 thereby enabling the rollers to be adjustably positioned relative to each other and longitudinally of the hull 14.

The rear roller 90 adjacent the drive shaft 32 is provided with a diametrically reduced midportion 97 to which is secured a drive sprocket 98 and there is secured to the drive shaft 32 a driven sprocket 100 which is in alignment with drive sprocket 98. In order to effect rotation of the drive shaft 32 upon rotation of the rollers 90 there is provided an endless chain 102 which is entrained about the drive and driven sprockets 98 and 100.

With attention directed more particularly to FIGURE 1 of the drawings, it will be noted that the rollers 90 are spaced from each other a sufficient amount and from the turntable 58 so as to be positioned beneath the driving wheels 104 of the vehicle 88 so that the frictional engagement of the wheel 104 on the rollers 90 will effect rotation of the rollers upon rotation of the wheels and thereby effect rotation to the propeller 26 of the boat 10.

It is to be understood that any convenient means may be provided or adjustably positioning the idler sprockets 70 longitudinally of the mounting beam 62 so as to ensure that the slack in the chain 74 is taken up when the turntables 58 are adjustably positioned closer to each other or the mounting beam 38 is adjustably positioned closer to the mounting beam 62 in order to adapt the vehicle power and steering system 12 to be used and powered by vehicles of different wheel bases.

It is further to be understood that while smaller adjustments in the spacing of the rollers 90 from the turntable 58 may be made by the adjustment of the mounting beam 38 but that larger adjustments for very short or very long vehicles, may be made by adjusting the rollers 90 in the desired notch 94. When the position of the rollers is changed the chain 102 will be replaced with a chain of suitable length.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with boats of the type having a rudder on a rudder shaft and a rotating driving means having a drive shaft, a vehicle power and steering system comprising steering and driving assemblies adapted to be engaged and driven by the turning and driving wheels respectively of a vehicle, first and second means securing said steering and driving assemblies respectively in said boat and in spaced relation to each other, first and second means operatively connecting said steering and driving assemblies to said rudder and driving means respectively, said steering assemblies including a pair of spaced turntables, a first mounting beam, means mounting said first mounting beam in said boat extending transversely thereof and for sliding movement longitudinally of said boat, means mounting each of said turntables on said beam for rotation about vertical axes and for sliding movement longitudinally of said beam, each of said turntables including a sprocket, a second mounting beam, means mounting said second mounting beam in said boat extending transversely thereof, a pair of idler sprockets, means mounting each of said idler sprockets on said second beam for rotation about vertical axes and for sliding movement longitudinally of said second beam, an endless chain entrained about said turntable and idler sprockets.

2. The combination of claim 1 wherein said driving assembly includes a pair of spaced rollers, means journaling said rollers for rotation about horizontal axes extending transversely of said boat.

3. The combination of claim 2 wherein said last mentioned journaling means includes means for adjustably positioning said rollers longitudinally of said boat and in adjusted spaced relation to each other.

4. The combination of claim 3 including a drive sprocket secured to one of said shafts, a driven sprocket secured to said drive shafts in alignment with said drive sprocket, said second connecting means comprising an endless chain entrained about said last two mentioned sprockets.

References Cited in the file of this patent

UNITED STATES PATENTS

| | | |
|---|---|---|
| 1,804,262 | Lewis et al. | May 5, 1931 |
| 2,334,932 | Kaloshin | Nov. 23, 1943 |
| 2,342,535 | Frova | Feb. 22, 1944 |